(12) United States Patent
Chow et al.

(10) Patent No.: US 6,873,601 B1
(45) Date of Patent: Mar. 29, 2005

(54) RADIO NETWORK PERFORMANCE MANAGEMENT

(75) Inventors: Peter El Kwan Chow, Orlando, FL (US); Kevin J. Krizman, Orlando, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 0 days.

(21) Appl. No.: 09/304,673

(22) Filed: May 4, 1999

Related U.S. Application Data

(63) Continuation-in-part of application No. 09/162,967, filed on Sep. 29, 1999.

(51) Int. Cl.[7] .............................................. H04L 12/26
(52) U.S. Cl. ...................................... 370/254; 702/188
(58) Field of Search ................................. 370/241, 242, 370/244, 252, 254; 720/188, 189–195; 709/223, 224

(56) References Cited

U.S. PATENT DOCUMENTS

| | | | | |
|---|---|---|---|---|
| 5,946,300 A | * | 8/1999 | Wilbrod | 370/241 |
| 6,339,705 B1 | * | 1/2002 | Pehrson | 455/419 |
| 6,665,262 B1 | * | 12/2003 | Lindskog et al. | 370/216 |
| 6,729,929 B1 | * | 5/2004 | Sayers et al. | 455/446 |

* cited by examiner

Primary Examiner—Ajit Patel
(74) Attorney, Agent, or Firm—Fulbright & Jaworski LLP

(57) ABSTRACT

A system and method for testing a radio network. A user at a central site may choose specific radios to be tested and specific test parameters for each one. The user may specify start and stop times, sample rates, whether one or multiple links are to be simultaneously tested, whether results should be presented as snap shots, statistical tables/graphs/charts, or as correlated data from multiple links. Distributed testing is permitted, in which the operational characteristics of one radio are varied, and another radio is monitored for a corresponding change. Once data has been gathered from one or more tests on one or more links, the data may be returned to the central site for analysis and presentation to the user in the selected format.

36 Claims, 6 Drawing Sheets

RADIO NETWORK PERFORMANCE MANAGEMENT

RELATED APPLICATIONS

The present application is a continuation-in-part application of copending and commonly assigned U.S. Patent Application entitled "SYSTEM AND METHOD OF CONTROLLING CO-CHANNEL INTERFERENCE IN POINT TO POINT COMMUNICATIONS," Ser. No. 09/162,967, filed Sep. 29, 1999, the disclosure of which is incorporated herein by reference.

Reference is made to the following co-pending and commonly assigned U.S. Patent Application entitled "COMMERCIAL NETWORK BASED ON POINT TO POINT RADIOS", Ser. No. 09/245,701, filed Feb. 6, 1999, co-pending and commonly assigned U.S. Patent Application, Ser. No. 09/300,575 entitled "MANAGEMENT OF RADIO NETWORK THROUGH IP ETHERNET", filed Apr. 27, 1999, co-pending and commonly assigned U.S. Patent Application, Ser. No. 09/300,114 entitled "MICROWAVE RADIO OVERHEAD CHANNEL", filed Apr. 27, 1999, the disclosures of which are incorporated herein by reference.

TECHNICAL FIELD

The invention relates to the field of management in a network of radios providing data communication through a plurality of interconnected links. More particularly, it relates to specifying, collecting and communicating relevant data involving the operation and performance of a radio-based network.

BACKGROUND

Large networks may contain many pieces of equipment and communication links distributed over a large geographic area, all of which must operate together in an integrated manner. Such networks not only need a network management system, but network management system generally benefit from remote or centralized control capability. A good example of this capability is the industry standard of Transmission Management Network ((TMN) that defines the function of network system operation, alarm, maintenance and provisioning (Parameter monitoring ). This industry standard was used in support of the development of the Synchronous Optical Network transmission system (SONET).

Such management systems are effective in dealing with systems where problems are mainly basic equipment faults, but they are not effective in dealing with problems that are more complex than a simple equipment failure. In radio systems, many operational conditions are transient in nature, such as weather-related, propagation, and mutual interference communication problems. Under these conditions, one does not have a steady fault to troubleshoot the network problem. For an example, point-to-point radio systems are often designed with a 20 to 40 dB transmit power margin to overcome signal fading in the propagation channel. Since there is a substantial margin under normal conditions, any degradation from interference, antenna misalignment, etc. will generally be compensated by using up a portion of margin to maintain constant performance. However, such a link will have more degradation during the increase of propagation attenuation than otherwise, and thus may experience undesirable results only upon occurrence of increased propagation attenuation. Trouble shooting of transient network conditions is extremely difficult because the environmental conditions that create the problem do not exist all the time. In order to understand the nature of the performance problem, it is necessary to measure the performance of the network while the fault is happening.

An additional problem occurs when an area is so densely populated with radio links that transmissions from one link are detected by, and interfere with, another link. Side-lobe propagation can interfere with radio receivers that are not supposed to be in the transmit path. Similarly, an antenna that becomes slightly misaligned may inadvertently point to an unrelated transmitter or receiver. Problems such as these do not involve equipment failures that can be quickly detected, and the equipment that is causing the problem is frequently not the equipment that shows degraded performance. For example, where the above mentioned transmit margin of 20 to 40 dB is utilized, the side lobes of such a misaligned antenna beam may be of sufficient magnitude to establish communications between the receiver/transmitter pair on a clear day, although a nearby link may experience disabling interference from the misdirected main lobe. An integrated analysis capability is needed to troubleshoot these types of problems.

Managing the operation and performance of radio networks involves two problems which are not addressed by conventional Parameter monitoring standards. The first is that each radio should have the capability of measuring and recording performance-related parameters in order to both provide cognizance of radio link conditions experienced as well as a knowledge base suitable for detecting changes in the radio link conditions. The second, more complex, problem is how to measure the right data at the right time in order to properly assess link conditions. For example, if one wants to measure the performance of power control, one way is to measure how constant the received power is, since the purpose of power control is to maintain the received power at a constant level. Changes in received power are frequently related to weather conditions such as rain fall density. However, 90% or more of the time the rainfall density is at or near zero (the weather is clear). So if the receive power is measured continuously, then 90% of data does not yield useful information. Since one would like the receive power to be read and recorded automatically in order to provide substantially autonomous alarm conditions or change in link or network operation, then the reading and recording rate shall be selected carefully. If a continuous rate is high enough to nearly instantaneously catch the onset of rain and any change in density thereafter, then the total amount of data may not be manageable.

What is needed is a system and method for specifying which measurements should be taken at which locations, when they should be taken, how often they should be taken, when the results should be collected, and how the results should be presented. Since the conditions that dictate some of these requirements tend to be unpredictable and transient, it is desirable to be able to dictate the measurement parameters on an as-needed basis, preferably from a centralized location.

SUMMARY OF THE INVENTION

The present invention solves the aforementioned problems by providing a method and system for specifying, controlling, measuring, recording, and/or analyzing radio performance-related items for propagation analysis, equipment performance, problem prevention and/or troubleshooting in a distributed radio environment.

The radio network performance management system may include two types of physical systems. The first may be a control system such as a host at a Network or Systems Operation and Management Center (NOMC) and/or other offices, i.e., the host may be a computer or other system operating under control of an operations control application providing centralized or even distributed control of the radio network according to the present invention, and containing capability for user interface, test configuration, results analysis, and results presentation. The second may be an in-service performance parameter monitoring or measurement capability system (parameter monitoring systems or denies) at each of multiple radio sites (or which may be an integral part of these radio sites), preferably containing the capability to receive test, monitoring or measurement instructions, perform monitoring and/or measurements as directed by those instructions, as well as resident operating instructions, store the results, and forward those results to a control system or other host for analysis, presentation, and/or use of the results. The parameter monitoring system of the present invention can preferably monitor multiple parameters at a time and/or operate according to conditional measurement that control a measurement or monitoring starting condition, such as based on a condition of one or more parameters. In a preferred embodiment, the NOMC, as well as other systems on the network, will contain the first type of system or at least a portion thereof, while radio sites will contain the second type of system.

In a preferred sequence of events, a user, such as a system administrator, may request a certain type of performance data. In response, a program at the NOMC can query the user for more specific details of his/her request. Once the detailed request is completed, the program may translate the request into test requirements and forward these requirements to one or more radio parameter monitoring devices for actual measurement. Once the measurements are complete or partially complete, the results may be passed from the radio parameter monitoring device back to the NOMC for analysis and presentation to the user in the form requested by the user.

The requested operations may, for example, perform single point testing/monitoring, or perform a set of mutually interfering radio problems where the source of the problem is not necessarily residing in the unit that detects the problem.

The requested operations may perform remote or local optimization of a radio, set of radios, such as mutually interfering radios or the radios of a particular link, and/or other network link equipment elements utilized by the radio network.

The requested operations may query individual radios or a group of radios, such as a subset of radios of the network known to be disposed in an arrangement likely to experience interaction, for performance information either autonomously, autonomously with conditions, or on demand.

The requested operations may have the ability to execute the data collections and processing based on a user's point of interest.

The radio sites may include the capability of doing performance measurement and reporting.

The requested results may be presented as snapshot data (data from a single point in time), statistical data (reduced data collected over a period of time), or correlation data (showing relationship between various parameters).

The requested results may show performance of a single link, simultaneous performance of multiple links, or propagation data.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1A:
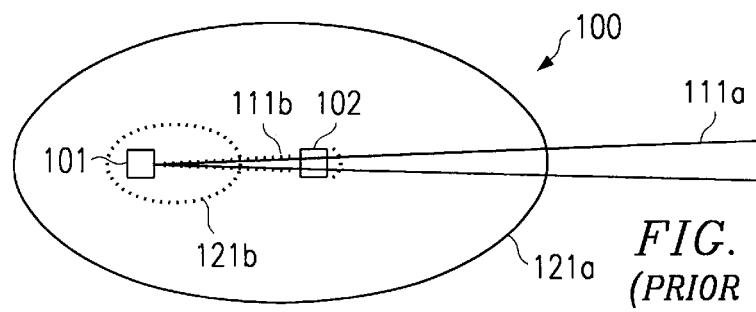
FIG. 1A shows the radiation pattern contours of a prior art point-to-point communication system.

In a typical point-to-point communication system communication links are established between a transmitter and receiver pair in order to carry signals and information there between. For example, directing attention to FIG. 1A wherein a prior art point-to-point communication link is shown generally as system 100, transmitter 101 and receiver 102 form a transmitter/receiver pair. Here transmitter 101 has main beam 111a directed toward receiver 102 in order to establish a wireless communication link suitable for providing signals and information there between. Transmitter 101 also includes area of influence 121a, which may consist of side lobes, back lobes, and the like, wherein signals radiated by transmitter 101 may be received outside of main beam 111a.

Accordingly, any receiver disposed within either main beam 111a or area of influence 121a may establish communication with transmitter 101. However, in a point-to-point system, it is typically desired that only a single receiver establish communication with a particular transmitter. Therefore, the portions of main beam 111a extending beyond receiver 102 (the main beam shadow) potentially introduce interference into the communication links of other transmitter/receiver pairs. Likewise, area of influence 121a potentially introduces interference into the communication links of other transmitter/receiver pairs.

The environment into which such communications links are typically deployed include dynamically changing circumstances which may affect the propagation of radiated signals. For example, the difference in signal attenuation between a transmitter and receiver from a clear to rainy day may be as much as 40 dB per km. The effects of such temporary circumstances are illustrated as attenuated main beam 111b and attenuated area of influence 121b.

It shall be appreciated that, in order to provide a sufficient signal to be received by the receiver of a transmitter/receiver pair during periods of extreme signal attenuation, the transmitter of the transmitter/receiver pair must transmit at an increased power level, even during periods of reduced signal attenuation, where the system utilizes a constant transmitted signal power level. Therefore, other such transmitter/receiver pairs in such a prior art system must either be excluded from these areas or must utilize a portion of the spectrum sufficiently different to avoid co-channel interference.

Moreover, as the conditions affecting the link parameters may not be constant over large areas, i.e., the rain rate is never uniform over a large area of many miles, and thus is not completely predictable, the system is typically designed for worst case scenarios wherein a condition has a maximum effect on the link throughout the link distance. Only then may confidence be instilled that the link may be maintained during all conditions. Therefore, the area in which other such transmitter/receiver pairs must be excluded may be unnecessarily enlarged in order to be confident that the effects of co-channel interference are remediated under all circumstances.

Figure 1B:
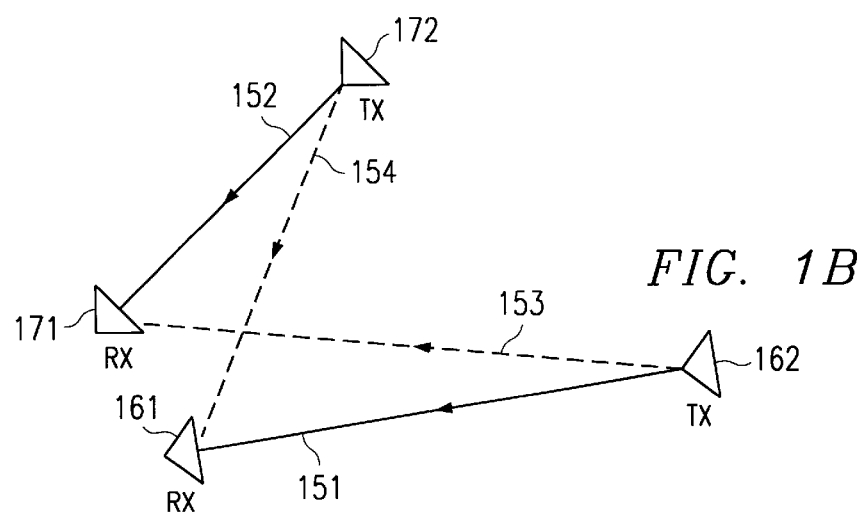
FIGS. 1B and 1C show incidents of interference as between closely located transmitter/receiver pairs.

For example, consider two radio links 151 and 152, where two receivers, receivers 161 and 171, are closely located as shown in FIG. 1B. For simplicity, it is assumed that the distance between one transmitter, transmitters 162 and 172, to both receivers is approximately the same. Accordingly, the signal level at the antenna input of the receivers, with respect to signals from both transmitters, is approximately the same level, i.e., link signal 151 and interference signal 154 at receiver 161 are approximately the same level and link signal 152 and interference signal 153 at receiver 171 are approximately the same level, although having a different incident angle. However, the received signal after acceptance by the antenna will be different due to the antenna pattern having a variable gain with incident angle. The design of link 151 has to make sure that the ratio of link signal 151 to interference signal 154 is sufficient to meet the performance requirement.

For 20 to 40 GHz radio transmission systems, the propagation loss is a time variant due to water and vapor in the air, like rain. A rain margin of 20 to 50 dB is a necessity for a reasonable hop distance. For systems that have no power control, the transmitted power level is constant and includes these rain margins all the time. On a clear day, the propagation loss is low, so the received signal is high and so is the interference. However, since the rain fall density is not always uniform over a large area, the propagation loss between links 151 and 152 are also a time variant, especially during heavy rain.

Figure 1C:
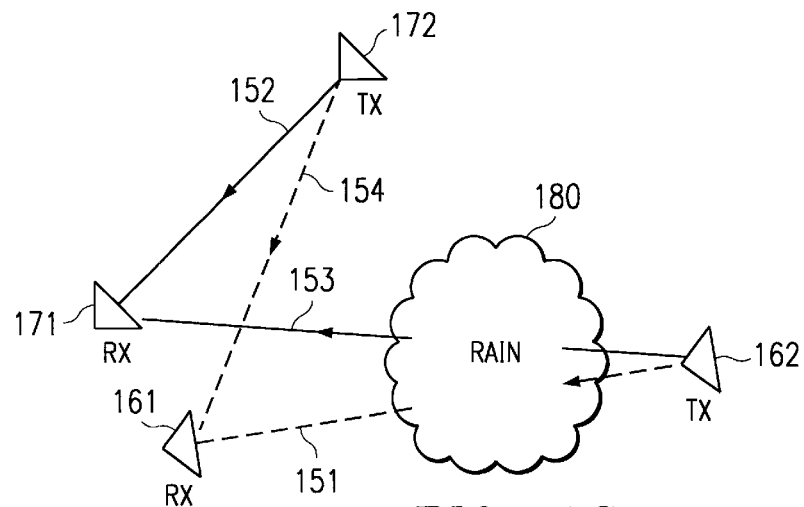

FIG. 1C shows a case where the propagation loss difference is at the extreme, e.g., one link has area of rain 180, while the other is not affected. Assuming the ratio of signal to interference at receiver 161 under normal conditions is XdB and the loss due to rain is YdB, where Y could be a large number like 20 dB. The signal to interference ratio for the case shown in FIG. 1C is (X-Y) dB. This means the link budget design must include the interference and propagation loss between the intended path and the interfering path.

The one aspect of the present invention utilizes automatic link parameter adjustment, such as power control adjustment to maintain a constant link characteristic as received when the propagation loss is time variant. Directing attention to FIG. 2, the contour of a communication system 200 having a transmitter/receiver pair operating according to the present invention is shown. Here transmitter 201 has main beam 211 directed toward receiver 202 in order to establish a wireless communication link suitable for providing signals and information there between. Transmitter 201 also includes area of influence 221a, which may consist of side lobes, back lobes, and the like, wherein signals radiated by transmitter 201 may be received outside of main beam 211.

Accordingly, any receiver disposed within either main beam 211 or area of influence 221a may establish communication with transmitter 101. However it should be appreciated that the area associated with both main beam 211 and area of influence 221 are significantly smaller than those shown in FIG. 1A discussed above. Accordingly, additional transmitter/receiver pairs may be deployed much more closely to the transmitter/receiver pair of FIG. 2.

Figure 2:
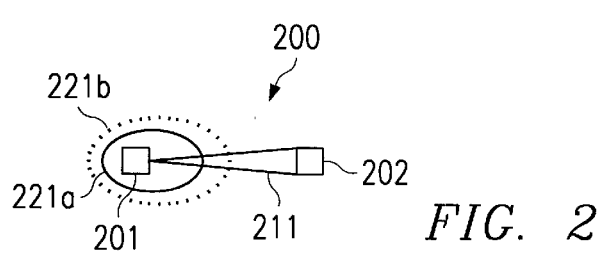
FIG. 2 shows the radiation pattern contours of a point-to-point communication system adapted according to the present invention.

In order to avoid signal degradation or communication link failure during the aforementioned occurrences of dynamically changing conditions, the system of FIG. 2 operates to measure link characteristics at receiver 202 and adjust transmission at transmitter 201 to provide a substantially constant communication parameters as measured at the receiver. This is illustrated as main beam 211 remaining substantially a constant size, i.e., no attenuated main beam is illustrated as in the system of FIG. 1A.

However, as communication parameters must necessarily be adjusted to compensate for the changing conditions, i.e., the transmit power level of transmitter 201 is increased to remediate attenuation due to precipitation, the area of influence 221a may not remain constant as illustrated by slightly enlarged area of influence 221b. For example, the transmitted power may compensate for the propagation loss in the main beam and over compensate in the sidelobe areas. As it is of primary importance to maintain the communication link between transmitter 201 and receiver 202 and, if possible, maintain a consistent link performance characteristics, the fluctuation in this area of influence is tolerable according to the present invention provided it does not vary enough to present undesired interference with co-existing transmitter/receiver pairs or otherwise introduce undesired results.

When systems with power control are deployed according to the present invention, the received signal level is maintained at an approximate constant. Accordingly, the difference in propagation between the links is immaterial, because the signal and interference level will be maintained as a constant. Therefore, it is desirable to have a power control range that is greater than or equal to the rain margin.

From the above it may be seen that, in terms of system operation point of view, major differences in the prior art system and that of the present invention exist in that the constant transmitted power system of the prior art is interference limited during periods of low propagation loss (on a clear day) and thermal limited during periods of high propagation loss (on a rainy day), while the constant received signal power system of the present invention is thermal limited all the time. Moreover, since the rain rate is never uniform over a large area of many miles, the transition from the interference to thermal limited condition of the prior art system will not be uniform. Accordingly, the overall network performance is extremely complex to analyze, and therefore difficult to deploy additional non-interfering transmitter/receiver pairs. Additionally, it is very likely that not every link with a constant transmitted power line will meet the performance requirement with some rain pattern.

In contrast, the constant received power system of the present invention has a small area of variation. Accordingly, the performance management of a radio network is feasible.

Figure 3:
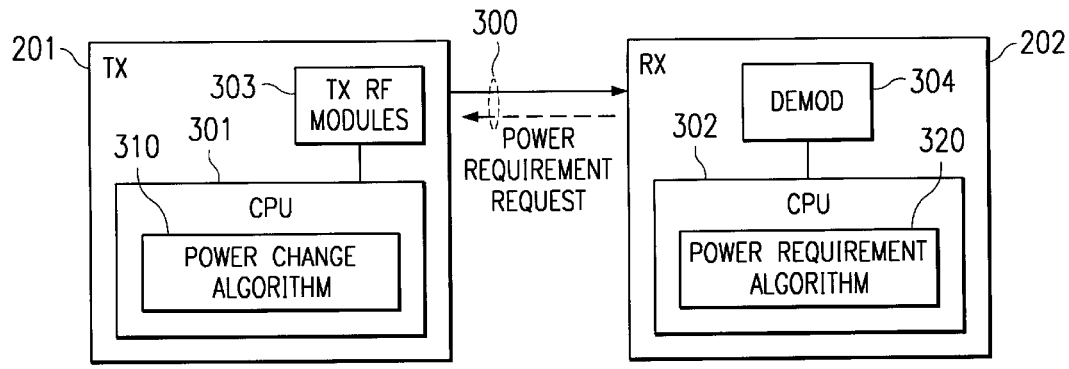
FIG. 3 shows a block diagram of a preferred embodiment of a control system according to the present invention.

Directing attention to FIG. 3, a block diagram of a transmitter/receiver pair adapted according to the present invention is shown. According to the present invention, a control system is included to maintain link parameters at a constant level under all propagation loss conditions over a radio link. Preferably, the control system utilizes a closed loop power control system wherein the received signal error level is detected and used to adjust the transmitted power.

As shown in FIG. 3, the preferred embodiment of the present invention includes two parts functioning to provide a closed loop control system. Preferably, a portion of the control system is deployed in or with receiver 202, shown in FIG. 3 as power requirement algorithm 320, and another portion of the control system is deployed in or with transmitter 201, shown in FIG. 3 as power change algorithm 310, in communication through link 300.

An advantage in providing the control system at least in part in the receiver is that it is at the receiver that the signal characteristics as actually experienced over the link are most easily measured. An advantage in providing the control system at least in part in the transmitter is that not only may the controller operate to adjust the transmitter as requested, but if any fault develops in the system, the control system may recognize the fault condition and determine whether leave the transmitter adjusted as it is, or adjust the transmitter in response to the fault condition. For example, the control system may command the transmitter to reduce transmission power during certain detected faults, irrespective of a request for increased power, as in particular instances if transmitter transmits more power it is not going to improve the signal as received by the receiver.

In the preferred embodiment, power requirement algorithm 320, operating on a processor based system such as with CPU 302 of receiver 202, is coupled to receiver circuitry, such as demodulator 304, to accept signals therefrom and to determine whether attributes of the received signal are above or below a predetermined acceptable level. A request of power change output will be sent, such as through a reverse channel of link 300, to transmitter 201 on other side of the radio link.

It shall be appreciated that in a typical point-to-point system each site includes both a transmitter and a receiver, i.e., a reverse link substantially the same as the forward link illustrated in FIG. 2 exists for each transmitter/receiver pair. Generally this reverse link operates at a different frequency than that of the forward link, i.e., frequency division of forward channels and reverse channels. Of course, the reverse link may be established through time division duplexing (TDD), CDMA, or other such multiple access schemes, if desired. The reverse link is generally utilized for subscriber payload, i.e., the subscriber utilizes a bidirectional information link. Often, however, a control channel is included in this reverse channel link (control channels may also be included in the forward link). Accordingly, the present invention utilizes this control channel in providing a link between the portion of the control system disposed in the receiver and that disposed in the transmitter.

The control channel may be a bit overhead on each packet of data sent and, therefore, somewhat limited in bandwidth. Accordingly, the present invention is preferably operable to optimize the communication of control system information in the control channel.

However, it should be appreciated that the use of a control channel in an existing bidirectional link between the transmitter/receiver pair is not necessary for the operation of the present invention. For example, a reverse channel link may be established solely for the control system information communication of the present invention. For example, where only a mono-directional wireless link is deployed, the control system of the present invention may utilize other means for communication link parameter adjustment information, such as a public switched telephone network (PSTN), a wide area network (WAN), the Internet, a cable system, or the like. Moreover, as the reverse channel necessary for operation of the preferred embodiment is optimized, the reverse link utilized may provide a substantially narrower bandwidth than that of the forward link subscriber communication, thus minimizing its cost and complexity. Additionally, the use of such a link external to the point-to-point system may accommodate a forward link control channel and thus free up additional subscriber pay load.

In the preferred embodiment, power change algorithm 310, operating on a processor based system such as CPU 301 of transmitter 201, is coupled to transmitter circuitry, such as transmit radio frequency (Tx RF) modules 303, to accept the request from power requirement algorithm 320 and determine whether transmitter 201 should be adjusted as requested or not. If it is determined that the transmitter 201 should be adjusted, a command signal is provided by power change algorithm 310 to adjustment circuitry of transmitter 201, such as an electronic controlled attenuator located in Tx RF modules 303.

It shall be appreciated that although the preferred embodiment described above utilizes CPUs associated with transmitter 201 and receiver 202 for operation of power change algorithm 310 and power requirement algorithm 320 respectively, this is not a limitation of the present invention. For example, an alternative embodiment of the present invention may utilize general purpose processor based systems, such as a personal computer system based on the INTEL 80X86 family of central processors, having memory associated therewith in order to store and execute the above algorithms and being adapted to interface with transmitter 201 or receiver 202.

As described above, preferably the receive demodulators are the source of information with respect to the receive side of link 300. Utilizing demodulators 304, power requirement algorithm 320 is able to acquire information with respect to link performance. For example, in the preferred embodiment, from information provided by demodulators 304, power requirement algorithm 320 is provided information with respect to the bit error rate (BER) of the signal as well as receive signal strength indicators. Based on this information, power requirement algorithm 320 can determine in real time whether the power should be adjusted from the current levels and, if so, whether this adjustment should be up or down.

Figure 4:
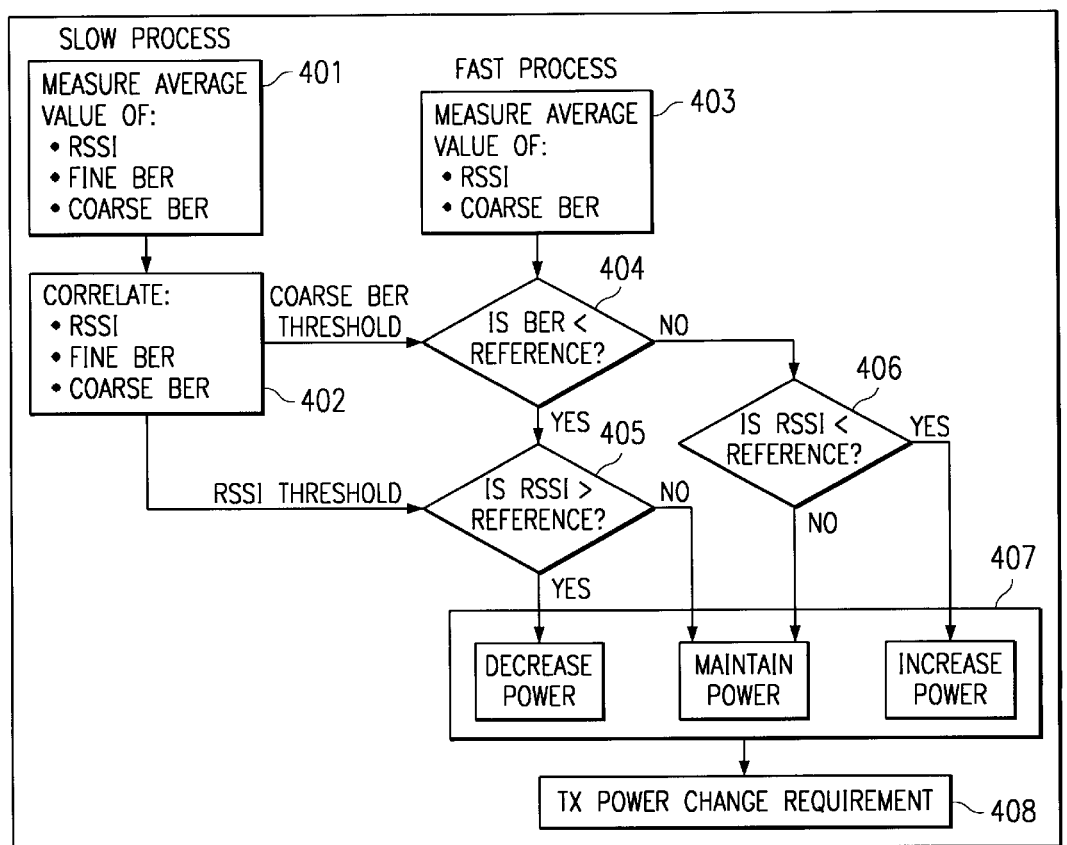
FIG. 4 shows a flow diagram of the power requirement algorithm of the control system of FIG. 3.

Directing attention to FIG. 4, a flow diagram of the operation of power requirement algorithm 320 according to a preferred embodiment of the present invention is shown. In the preferred embodiment, link performance as experienced by the receiver is measured in the adjusting of link parameters to compensate for changing link conditions. Accordingly, power change algorithm 320 measures the BER of the communication link. Of course, other measurements of link performance may be made according to the present invention, if desired. For example, an alternative embodiment of the present invention may measure received signal characteristics such as received signal level, received signal level to noise level, or the like.

In providing a high speed data communication system, it is desired that the data communicated be reliable and that retransmission of data be avoided in order to avoid wasting bandwidth with repeated transmission of information. Accordingly, the link error rates are preferably set quite low. For example, a BER established for a particular link may be on an order of magnitude of $10^{-12}$, i.e., in every $10^{12}$ received bits, one error will be experienced. Accordingly, where the link is transmitting at 100 Mbits per second, it would take 2.78 hours to detect one error.

Preferably, the control system of the present invention operates to substantially match adjustment of the communication system to the rate of environment change, or other dynamic conditions affecting link performance, in order to maintain the desired link performance level. However, matching the rate of environment change in many cases would require continuous and instantaneous measurement of link performance and adjustment of link parameters. Alternatively, such continuous and instantaneous measurements and adjustment may be dispensed with in favor of incremental measurement and/or adjustment, i.e., providing margins in which operation is allowed.

There is a trade off as to the adjustment step size versus how frequently such adjustments are made. If the system were to make adjustments slowly, then larger adjustment steps are required to match the environmental changes. In order to maintain at least a minimum desired link quality between such large adjustment steps, a larger margin in the link quality as experienced by the receiver must be tolerated.

For example, where the measurement of link performance is accomplished through reference to a receive signal strength, a particular power level may be selected, i.e., X dB. If adjustments are to be made in increments of 1 dB, even when the receive signal is strong, the system would have to operate at X+1 dB in order to allow for link degradation to the preselected minimum of X dB prior to the minimum incremental adjustment of 1 dB. This, however, translates into increases in the areas of exclusion around this transmitter/receiver pair as the transmitter is transmitting at all time a power level sufficient to compensate for the large incremental adjustment established.

Moreover, if the adjustment steps are too large, the receiver might not be able to work properly. For example, suddenly making large changes in the transmitted power level may cause problems in the receiver AGC, locking loops, etcetera. Accordingly, it is desirable to make determinations as to the need to adjust transmission parameters sufficiently often enough to allow a desired and tolerable level of incremental adjustment to be employed.

However, it may not always be possible to make such rapid determinations. For example, the above described preferred embodiment utilizing BER determinations may require substantial lengths of time to determine. It should be appreciated that environmental conditions may be change substantially in such lengths of time.

Accordingly, the preferred embodiment of the present invention utilizes multiple processes to determine link quality, preferably a slow more accurate process and a fast more coarse process. Ultimately it is desired that the information of the slow process will be the link performance reference point as this is the quality to actually be delivered, however, through correlation of the coarse process to the determinations of the fine process, instantaneous or nearly instantaneous determinations of link performance may be made.

The accurate measure of link performance, or fine BER measurement in the preferred embodiment, requires a long time to actually measure. Specifically, determination of fine BER is generally accomplished by counting the number of bit errors in an interval. The accuracy of the measurement is based on the number errors being counted during the measurement interval. Since it takes a long time to get some accuracy, a good compromise solution is to record the interval between two consecutive errors. The computation of fine BER may utilize a determination of the average error interval over last x errors, e.g. the last 10 errors. The number of bits in the average error interval is the bit rate times the average error interval. The fine BER is 1 over the number of bits in the average error interval. This measurement scheme allows the fine BER to be updated once every detected error.

However, there are less accurate indications of link performance which may be measured more quickly and, if utilized properly, can be used to provide a very good indication of the actual link performance. In the preferred embodiment of FIG. 4, two link parameters are measured very quickly, i.e., substantially instantaneously and continuously. Specifically, the receive signal strength indicator (RSSI) and coarse BER are measured for use in making a coarse link performance determination.

It is anticipated that the information communication of the transmitter/receiver pair of the present invention will utilize some form of error correction coding. Accordingly, the majority of transmission errors may be detected and corrected prior to the information being presented to the subscriber. The coarse BER of the present invention taps the error rate before such error correcting codes are utilized to correct transmission errors. Accordingly, errors may be detected much faster than if referencing the error rate as experienced by the subscriber.

However, there is not a one to one correlation between the coarse BER and the BER as experienced by the subscriber. Therefore, the preferred embodiment of the present invention utilizes a second link parameter in its coarse determination of link performance in order to more accurately correlate this information to the fine BER.

Moreover, it shall be appreciated that if a single link parameter measurement is relied upon alone for the fast determination of link parameter adjustment, hysteresis in the adjustment may be a problem. For example, due to noise and other phenomena affecting the communication link, if only the coarse BER were utilized in making the adjustment determination there may be a constant adjusting of the communication parameter as the coarse BER will likely fluctuate quite a bit, i.e., the coarse BER may be different for every half second in which adjustments are made. However, it is typically not desired to continuously adjust the transmitter, i.e., one up, one down, one up, one down, in response to such temporary variations which do not significantly impact link performance.

Accordingly, the preferred embodiment utilizes two measurements, both RSSI and coarse BER. When both are better than the reference (exceed a threshold, whether a ceiling or floor threshold), it is likely that the system is really transmitting too much power, and downward adjustment is advisable. However, if both are poorer than the threshold (do not exceed a threshold, whether a ceiling or floor threshold), it is likely that the system is really transmitting too little power, and upward adjustment is advisable. Where one of the parameters is better (exceeds a threshold, whether a ceiling or floor threshold) and the other parameter is poorer (does not exceed a threshold, whether a ceiling or floor threshold), this may be indicative of a slight environmental or other phenomena affecting the communication link, not worthy of adjustment in the link parameters.

Using the same method as described above with respect to the fine BER, the average coarse BER and the average RSSI are computed over each error interval. Accordingly, the final average coarse BER and RSSI computation will be based on the same interval as used for the fine BER computation, although these averages may be updated much more often than that of the fine BER.

Preferably the control system takes a plurality of samples of RSSI and coarse BER between two consecutive power change requests. In the preferred embodiment, the number of samples taken is based on the variation from one sample to another. Accordingly, where the system is fairly stable, processing power may be conserved by taking fewer samples and performing fewer calculations etcetera. However, where the system is experiencing more rapid variations, the control system reacts to make more rapid measurements in order to compensate for these variations more quickly and more accurately.

As shown in FIG. 4, the preferred embodiment computes the BER as experienced by the subscriber (box 401), which might take a couple of hours, and simultaneously measures the RSSI and course BER (box 403) to establish a reference. By recording the measured RSSI and coarse BER, an average of these measurements may be correlated to the fine BER ultimately measured for use in making more accurate fast determinations as to link performance (box 402), i.e., the slow measurement of link performance is translated into a fast measurement of link performance reference point.

The purpose of the correlation of the BER to RSSI and coarse BER in the preferred embodiment is to determine what the measured RSSI and coarse BER thresholds should be to achieve a desired fine BER, i.e., a BER that was defined by the system performance requirements. Based on the fine BER, average RSSI and coarse BER measurements, the correlator will set the RSSI and coarse BER thresholds either above or below the average RSSI and coarse BER depending on whether the fine BER as actually measured is worse or better than expected.

Once this slow measurement of link performance is transferred to a fast measurement reference point, thresholds may be established for substantially instantaneous or real time adjustment of the link parameters. This information may be utilized in determining if the currently measured parameters, i.e., coarse BER and RSSI, indicate adjustment of the link parameters is desired.

Specifically, if the coarse BER is lower than the threshold reference associated with the desired fine BER (box 404) and the RSSI is greater than the threshold reference associated with the desired fine BER (box 405) then a determination that the power level should be decreased may be made (box 407). Contrariwise, if the coarse BER is greater than the threshold reference associated with the desired fine BER (box 404) and the RSSI is greater than the threshold reference associated with the desired fine BER (box 406) then a determination that the power level should be increased may be made (box 407). However, if the coarse BER is lower than the threshold reference associated with the desired fine BER (404) and the RSSI is lower than the threshold reference associated with the desired fine BER (box 405) or if the coarse BER is greater than the threshold reference associated with the desired fine BER (box 404) and the RSSI is greater than the threshold reference associated with the desired fine BER (box 406) then a determination that the power level should remain the same may be made (box 407).

Accordingly, the decision algorithm decides what should be the next request with respect to the power level; increase, decrease, or no change. The power level change is based on the positive indications, i.e., both RSSI and coarse BER are better or poorer than the threshold. The less conclusive indications for changes, where only one of two parameters is better than the threshold, preferably result in no communication link adjustment.

The particular determination made according to the power requirement algorithm is preferably communicated to the portion of the control system actually operating to adjust the transmitter (box 408). However, it shall be appreciated that where no adjustment is desired, transmission of this determination may be omitted in order to avoid unnecessary utilization of a reverse link. Alternatively, the transmission of this "no change" information may be desired, such as where the determination is periodically and systematically communicated for use at the transmitter, such as to determine the continued operation of the portion of the control system deployed at the receiver.

Figure 5:
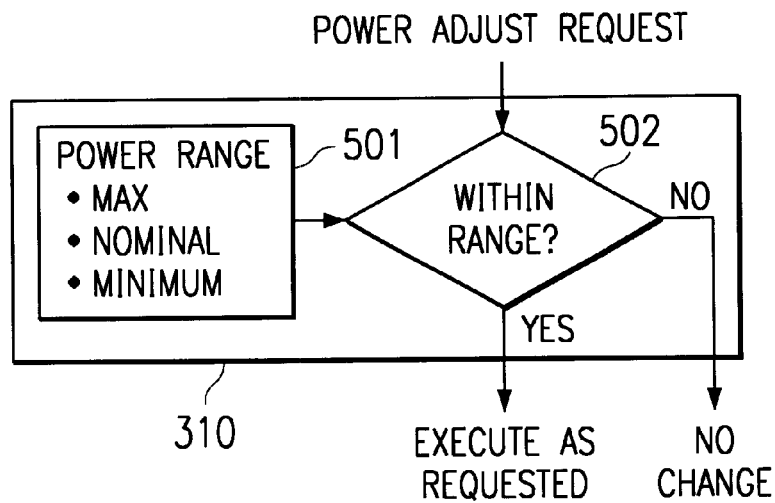
FIG. 5 shows a flow diagram of the power change algorithm of the control system of FIG. 3.

Having described the preferred embodiment of power requirement algorithm 320 of the present invention, reference is now made to FIG. 5 wherein a flow diagram of the preferred embodiment of power change algorithm 310 is shown. Preferably each link has associated therewith a maximum and minimum power level setting to protect each radio and/or other communication links during the occurrence of an abnormal condition. In the preferred embodiment this information is provided in a database, or other knowledge base, or reference table associated with, or accessible to, power change algorithm 310 as illustrated by box 501.

In the preferred embodiment, the maximum power level is set as a function of the link distance and link performance requirement. The minimum power level is also preferably established as a function of the link distance and link performance and may be utilized primarily to insure that the system is not totally turned down in order to minimize the start up process.

For example, considering two radio links; one radio link may have a longer link distance than the other. The longer distance link would typically have associated therewith a higher maximum and minimum power level than the shorter distance link. Another example is that two radio links, although having the same link distance, may have a different link availability performance requirement. Accordingly, the link having a higher link availability requirement would typically have a higher maximum power level than the link having the lower link availability requirement. Here, however, the minimum level would likely be the same for each link.

The nominal power level shown in the embodiment of FIG. 5 is preferably the power level that is transmitted most of the time. This nominal level may be computed from the link distance and/or may be computed from historical information associated with the link. In the preferred embodiment of the present invention the nominal power level is used as a reference level, such as a reference value to determine if the system is operating too long at a excessive power level, thus indicative of a system fault or some other unusual condition. Moreover, the nominal power level may be used to set the minimum transmitted power, e.g. the minimum power level may be set as X dB below the nominal power level.

The setting of link parameter ranges preferably accommodates the occurrence of special conditions. For example, the minimum power level may be set in case some extraordinary environmental condition or other anomaly occurs which temporarily makes the path a lot less lossy. If such a phenomena happens, it may not be desirable to adjust the power level below a certain point, although communications may be maintained during this phenomena, because when the phenomena disappears there may be no way to adjust the communication parameters quickly enough to avoid undesired loss of the link or other communication problems.

Similarly, the maximum power level may be set to avoid upwardly adjusting the power level in response to a phenomena which is such that no amount of power level adjustment would maintain the desired link performance. For example, it shall be appreciated that by setting the maximum level to, or slightly greater than, the least possible setting for maximum attenuation, such as may be accomplished by the below described calibration technique and/or through reference to historical operating conditions of the link, the system will allow compensation for such conditions while not allowing uncontrolled power increases when equipment fails that causes the service outage.

It should be appreciated that the use of the aforementioned values defining a power range allows the present invention to be adjusted for various conditions as well as to adapt according to historical information or other sources of a knowledge base. For example, in some cases it may be desired to provide link reliability of 99.999% ("five nines"), or that it is acceptable to loose data transmission for a total of 5 minutes per year, such as due to rain attenuation. This level of link reliability would require more power to compensate for times of heavy attenuation. Accordingly, the maximum power associated with the power range of power change algorithm 310 would be set higher. However, in some cases link reliability of 99.99% ("four nines"), or loss of data transmission for a total of 15 minutes per year, is acceptable. Then the maximum power level associated with the power range may be set to a lower level.

Moreover, it should be appreciated that the use of these adjustable parameters in the algorithm allows a single algorithm to operate the system within the designated parameters, which may be changed from time to time or from deployment to deployment, without the need for separate algorithms or functions for particular operating states or conditions. Instead, a single algorithm may simply determine if the requested adjustment is within the allowed parameters and make this change without actually determining under what conditions the system is operating. Accordingly, the present invention provides a simple but effective way in which a standard system may be developed and deployed and yet be adjusted for each link's operating environment, both initially upon deployment and later in response to historical operating information.

Power change algorithm 310 of the preferred embodiment operates to accept the power level change requests generated by power requirement algorithm 320 as illustrated in FIG. 5. Thereafter, the algorithm, through reference to the aforementioned power range information (box 501), determines if the requested power change would be within this range (box 502). If the requested change is within the power range, the change is executed as requested. However, if the change is not within the power range, the request is not implemented. For example, if a request for increased power is received, but the system is already operating at the maximum power level the requested power change would not be within the allowed range and, therefore, the request would not be honored.

If the decision is to change the transmitted power, then a message or control signal will be sent from power change algorithm 310 to Tx RF modules 303 to change the attenuator value. In a preferred embodiment, the adjustment in power level is in consistent increments. For example, if power change algorithm 310 instructs the attenuator to increase the transmitted power level, a single unit of power level increase is incremented. Likewise, if power change algorithm 310 instructs the attenuator to decrease the transmitted power level, a single unit of power level increase is decremented.

However, in an alternative embodiment, the link parameter adjustments may be nonlinear. For example, when increasing the power the system may increment in bigger steps but when decreasing the power the system may decrement in smaller steps. Likewise, the system may determine the frequency of parameter adjustment requests, i.e., successive requests to increase power, and make fewer larger adjustments rather than more smaller adjustments as these requests are repeated. For example, if the thresholds are crossed one time, the system adjusts the link parameter by one step. However, if the same thresholds are crossed a second time within a predetermined period of time, the system may adjust the link parameter by two steps. Alternatively, two sets of thresholds may be provided wherein if the first thresholds are crossed, the system adjusts the link parameter by one step, but if the second thresholds are crossed, the system adjusts the link parameter by two steps. These embodiments may be preferred where sudden attenuation is experienced such as through "cloud burst" type rain fall where small incremental steps in power increase may be insufficient to compensate for the very substantial and almost instantaneous attenuation.

It shall be appreciated that the size of these incremental adjustments as well as the conditions under which alternative incremental adjustments may be utilized may be provided in a database, or other knowledge base, or information table such as that utilized by the power range described above. Accordingly, as with the power range, the incremental adjustments may be tailored for the particular environment into which the system is deployed. This information may actually be stored within the same database, illustrated as box 501, as the power range. Alternatively, a separate database could be provided to store this information (not shown).

At initial power up, it is preferred that the system not wait for the fine BER measurement before starting operation according to the present invention. Accordingly, a set of default values, such as might be loaded from the factory, are utilized to get the system started. These defaults may be substantially arbitrary with respect to the particular link established or may be based on parameters known at the time of installation, such as link distance, for example.

When the system is operational, but either the fine BER cannot be measured, e.g. no error detected or just after power-up, a system calibration is preferably performed. This system calibration is utilized to establish the thresholds for determining link parameter adjustment and also preferably includes adjustment of the aforementioned default values of the power range information.

For example, it may take a long time to measure a particular desired error rate, assuming errors on the order of magnitude of $10^{-12}$. So after a lengthy period of measuring errors it might be concluded that there is substantially no error. Initially, it might appear that this conclusion of substantially no error is desired. However, if the system does not accurately know what the error rate is, it is possible that the system is transmitting with too much power thus, although providing a substantially error free link, interferes with other communications.

According to a preferred embodiment, calibration is performed by reducing the value of the three parameters, fine BER, coarse BER, and RSSI, which will cause the power requirement algorithm to force the transmitted power to go down. The reducing of these values is repeated until some measurable errors are detected. Once errors are detected, these values, or ones of these values, may again be adjusted, or increased, to achieve the desired link performance level.

In most cases, it is preferred that the design of power control system is set to operate slightly above the required performance to allow for some degradation between adjustments. Accordingly, a margin in the actual measured communication parameters and the required communication parameters, those suitable to result in the required link performance, is required. Therefore, the correlator of the preferred embodiment inserts system margins, where desired. For example, although the correlator determines that a particular RSSI, in combination with a particular coarse BER, is suitable for providing the desired link performance, the correlator provides a system margin in this determined value of RSSI. Accordingly, the correlator introduces or increases system margin by rasing the thresholds.

One of the tasks during installation and commissioning of the point-to-point transmitter/receiver pair is to align both antennas, i.e., in order that each antenna will be pointing at the other. However, as large distances may be spanned by such a system, the physical misadjustment of an antenna only a few degrees may result in one or both antennas aligned on a sidelobe, i.e., the antennas are pointing at each other on sidelobes rather than the main beam, where there is enough transmitted power to let this happen.

The preferred embodiment of the present invention avoids establishing communications through these undesired links by reducing the maximum power level of the power range to just above the nominal level (or level expected for communications over this particular length of link through the main antenna beam). Under this condition, the system can only work when the antenna is pointing at each in main beam. Moreover, this technique results in reducing the interference to an installed-base of radios during the alignment process by pointing the radio in a wrong direction.

Figure 6:
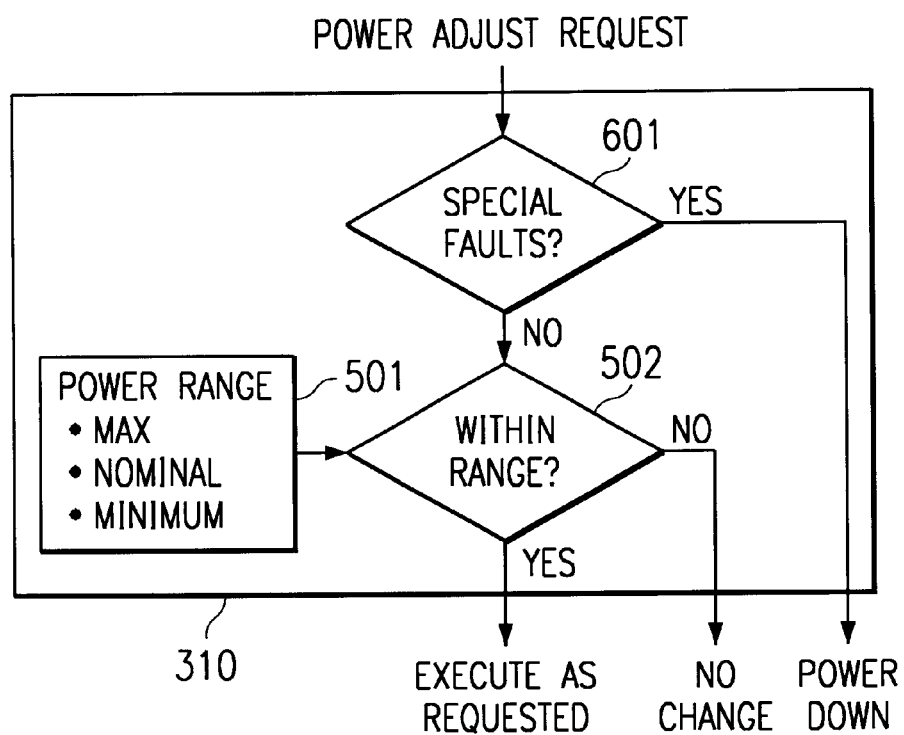
FIG. 6 shows a flow diagram of an alternative embodiment of the power change algorithm of the control system of FIG. 3.

A preferred embodiment of the present invention is adapted to recognize and react to system faults, especially those which may result in adjusting link parameters such that interference may be introduced into other links. Directing attention to FIG. 6, a flow diagram of a preferred embodiment of power change algorithm 310 is shown having a decision box therein for determining system faults (box 601).

Accordingly, in this embodiment requests for power level adjustments may not only be subject to a determination that the requested change is within the limits of the system as in FIG. 5, but will also be subject to a determination that the system is not in fault. If the system is determined to be in fault the system may be shut down and an operator notified. Alternatively, if the system is determined to be in fault, the system may continue to transmit at some predetermined level, such as the aforementioned nominal power level or the maximum power level, in order to potentially provide communication, although likely not at the desired link performance level.

System faults may be determined to exist through such means as measuring a duration at which the system is operating at a power level substantially higher than the nominal power level. For example, if experience has revealed that periods of substantial attenuation occur only briefly and the system has been operating at an increased power level for a length of time in excess of the historically experienced times, then a conclusion may be made that the system is in fault.

Likewise, the system may determine a fault condition from the number, type, and/or frequency of power change requests. For example, the system may continue to receive only requests to increase power levels over a long period of time. This might be indicative of antenna alignment drift rather than environmental conditions to be compensated for. Accordingly, the system may operate to determine that such increases are no longer prudent and notify an operator of a potential fault condition.

The preceding description addresses, inter alia, how to avoid and compensate for mutual interference problems as experienced at or may be caused by a link of a network. The remaining description addresses how to manage and control a network of radios, including commanding, monitoring and testing, that are already deployed to provide a communicating network such as that shown and described in the above referenced patent application entitled "COMMERCIAL NETWORK BASED ON POINT-TO-POINT RADIOS". It should be appreciated that, although the above described monitoring and adjustment of transmit power levels may be utilized in the network performance management described below, the present invention may be utilized without such adjustment of transmit levels, i.e., constant transmitted power systems, if desired.

A network performance management system of the invention preferably includes two types of facilities: central control and radio parameter monitoring devices. It shall be appreciated that, although referred to herein as central or centralized control, the present invention includes various forms of remote managing and controlling of network elements, including distributed, i.e., particular management and/or control functions are available at various network nodes or locations, and outpost control, i.e., management and/or control functions are equally available at various outposts based on the presence of a control algorithm, for example. A control facility or system may reside anywhere, but is preferably co-located with one of the network nodes at a NOMC. The central control facility may include a computer system for performing the functions of user interface, test operations/configuration, monitoring/ measurement request generation, results analysis, results presentation generation, and communications. Although a single control facility may be adequate, multiple such facilities may be provided for backup, load-sharing, or distributed control. A main purpose of the control facility is to assemble customized management and control requests from users and associated network test commands and/or network node control command, transmit the required operations/test commands and/or network node control commands to designated radios, receive any resulting data from the radios such as test measurement, control acknowledgments, and the like, analyze the received data, and present the analyzed data to the user.

Radio control, monitoring, measurement, and/or test devices (referred to herein as parameter monitoring devices) may be co-located with the radios, and may control and monitor various parameters of the radio. Although labeled herein as a "device", as parameter monitoring device may be functionally integrated into other equipment, may be a standalone component, and/or may be distributed among multiple physical components. A preferred embodiment includes a separate parameter monitoring device at each radio at each network node, but alternate embodiments might include multiple parameter monitoring devices per radio, a single parameter monitoring device per network node, or some nodes without any parameter monitoring device. In a preferred embodiment, radio parameter monitoring devices may include a processor, communications interfaces, a clock, and various pieces of test equipment that monitor and control radio performance under the direction of the processor. The clock may permit the processor to start and stop operations at specified times, with individual measurements triggered at specified intervals. The communications interfaces may permit control commands and operations requests to be received and results to be transmitted to the appropriate destination.

The central control facility may send multiple, interrelated control and/or operations commands to various radio parameter monitoring devices so that different radios may participate in the same operation, such as monitoring a particular portion of the network to identify a malfunctioning node or to optimize data transmission, even if these particular nodes are not in direct communication with each other. For instance, a first radio may be commanded to increase its transmit power by a specified amount at a specified time, while a second radio may be commanded to monitor its receive signal strength or a carrier to interference ratio at the same time. If the two radios are not in the same link, i.e., if the second radio is not supposed to detect transmissions from the first radio, a correlation between the two events could indicate the first radio is unintentionally interfering with the second. In a preferred embodiment, this determination is not made at the radio sites, but at the central facility when the results from the two separate operations are correlated and analyzed. Interrelated effects between two, three, or more radios may be detected and measured in this manner.

Alternately, a radio parameter monitoring device may be commanded to infrequently sample a parameter or parameters, such as receive signal strength carrier to interference, signal to noise, bit error rate, or the like, but trigger a higher sampling rate and maybe other measurements as well, if the sampled parameter crosses a predetermined threshold value. This could permit the radio parameter monitoring device to effectively initiate monitoring when a sporadic condition occurred (such as heavy rainfall attenuating the received signal strength or another radio is causing excessive interference), so that resources would be concentrated only when they were needed, but not wasted during the times of normal operation.

Figure 7A:
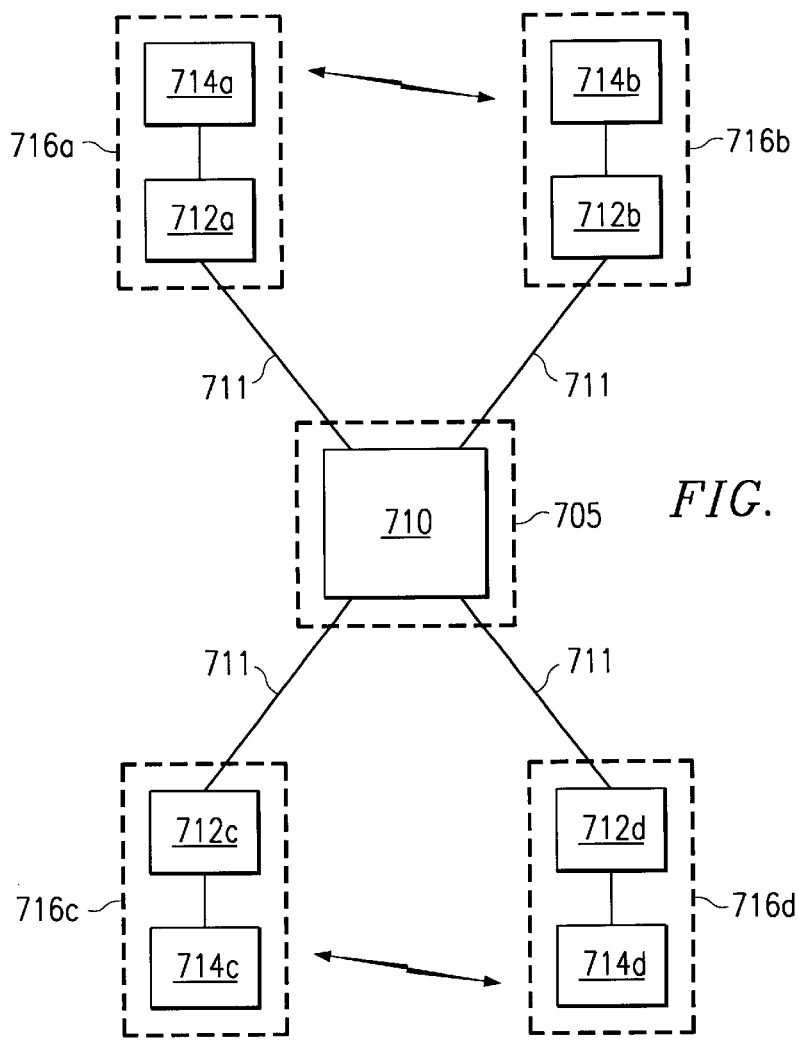
FIGS. 7A and 7B show a block diagram of a radio network management system.

FIG. 7A shows the physical components of a control and management system operable according to the present invention, wherein the illustrated topology is not intended to necessarily represent the actual connection of the components but to illustrate operation of the components according to the present invention. A central facility or system 710 may be at a NOMC node 705, and may contain a computer system programmed to receive a user request for management and control functions, configure commands and/or queries based on the user's choices in order to achieve the desired functionality, and send signals representing such commands and/or queries over communications links 711 to particular to radio parameter monitoring devices determined to be suitable for use in carrying out the desired functionality and/or which are selected by the user. The radio parameter monitoring devices 712 may receive and store the portions of one or more operations directed to it, and execute those operations on associated radio 714, each of node 716. Parameter monitoring device 712 may then send the results to central facility 710 to be analyzed and presented to the user and/or to be utilized in controlling the network, either by subsequent command of the user or by autonomous decision by the NOMC, such as through reference to a knowledge base. Additionally, or alternatively, the radio parameter monitoring devices 712 may receive and store the portions of one or more commands directed to it, and execute corresponding operations on associated radio 714. Parameter monitoring device 712 may then send an acknowledgment of the change in operation conditions to central facility 710 to demark the change for reference to conditions subsequently experienced at that, or other, radio links. Additionally, or alternatively, the parameter monitoring device 712 receiving such a command may operate to monitor operation of the associated radio 714 to detect any adverse or improved effects of operation of the command. Similarly, particular parameter monitoring device 712 receiving the command, or the central control facility, may instruct another parameter monitoring device or radio of the network, such as a radio of the far end of the link or other node, to change an operating parameter or operate to monitor operation of the radio to detect any adverse or improved effects of operation of the command.

Figure 8:
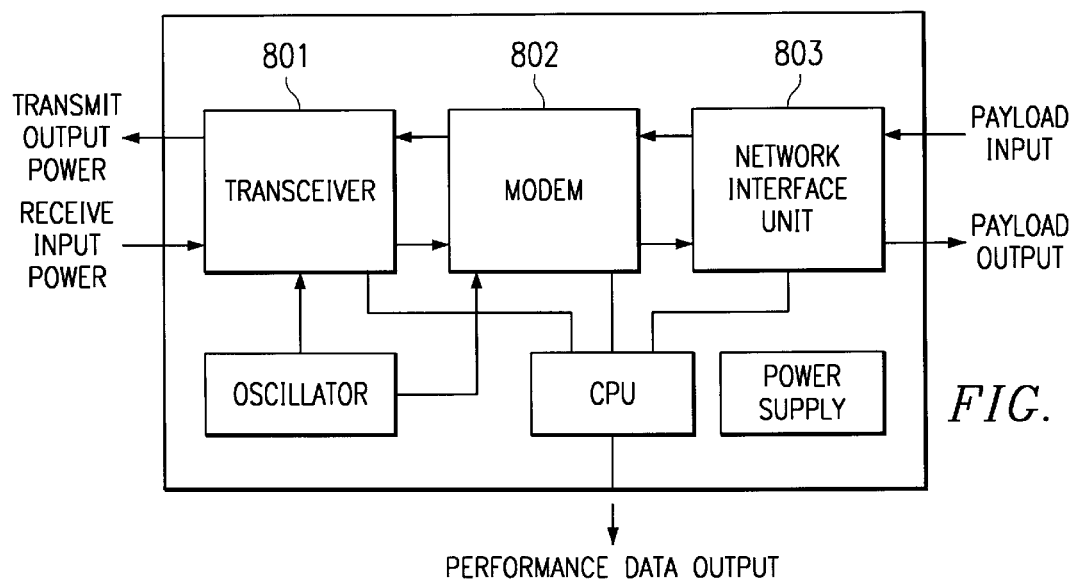
FIG. 8 shows a preferred embodiment radio.

Although mentioned herein as radios, it should be appreciated that the node radios as referenced to herein may include multiple components, such as shown in FIG. 8, which may be controlled separately or controlled together by an associated parameter monitoring device according to the present invention. For example, radios 714 may include transmitters, receivers, transceivers (801), modems (802), network interface units (803), amplifiers, digital signal processors, analogue to digital converters, digital to analogue converters, or the like, each or any of which may be controllable or monitorable by parameter monitoring device 712. In one embodiment parameter monitoring device 712 may be coupled to an error correcting and/or variable baud rate modem and a transmitter having adjustable transmission power levels, each represented in FIG. 7A as radio 714. Accordingly, a bit error rate at one node of a link, such as node 716a, may be monitored under control of an associated parameter monitoring device, in this example parameter monitoring device 712a, in response to commands from control facility 710 (or autonomously such as where particular conditions exist, i.e., a threshold condition has occurred). The results of this measurement may be forwarded to central facility 710 for analysis and subsequent appropriate action, such as instructing far end node 716b radio 714b transmitter to increase/decrease transmission power under control of parameter monitoring device 712b. Alternatively, parameter monitoring controller 712a may analyze the measured results and itself request radio 714b to adjust transmission power, substantially as described above with respect to FIGS. 5 and 6.

Although described above as utilizing only a single controllable/monitorable component at each node of the link, it should be appreciated that multiple ones of such components may be utilized at each node. For example, in the provision of bidirectional communication as between the nodes of the links, it can be readily appreciated that each of node 716a and 716b would benefit from a modem and transmitter as in the above described example.

It should be appreciated that the topology of FIG. 7A is for illustration purposes only and is not a limitation of the present invention. For example, the links between nodes, such as between radios 714a and 714b and between radios 714c and 714d, are preferably links of a larger network of information communication links, possibly including additional wireless links as well as links through media including copper and for fiber. For example, directing attention to FIG. 7B, a ring network topology is shown where nodes 716a–716d each include communication equipment suitable for providing a continued link in a network, such as the preferred embodiment radio pairs 714a and 714α, 714b and 714β, 714c and 714γ, and 714d and 714δ, as well as providing a node to which customer equipment may be coupled to the network.

Figure 7B:
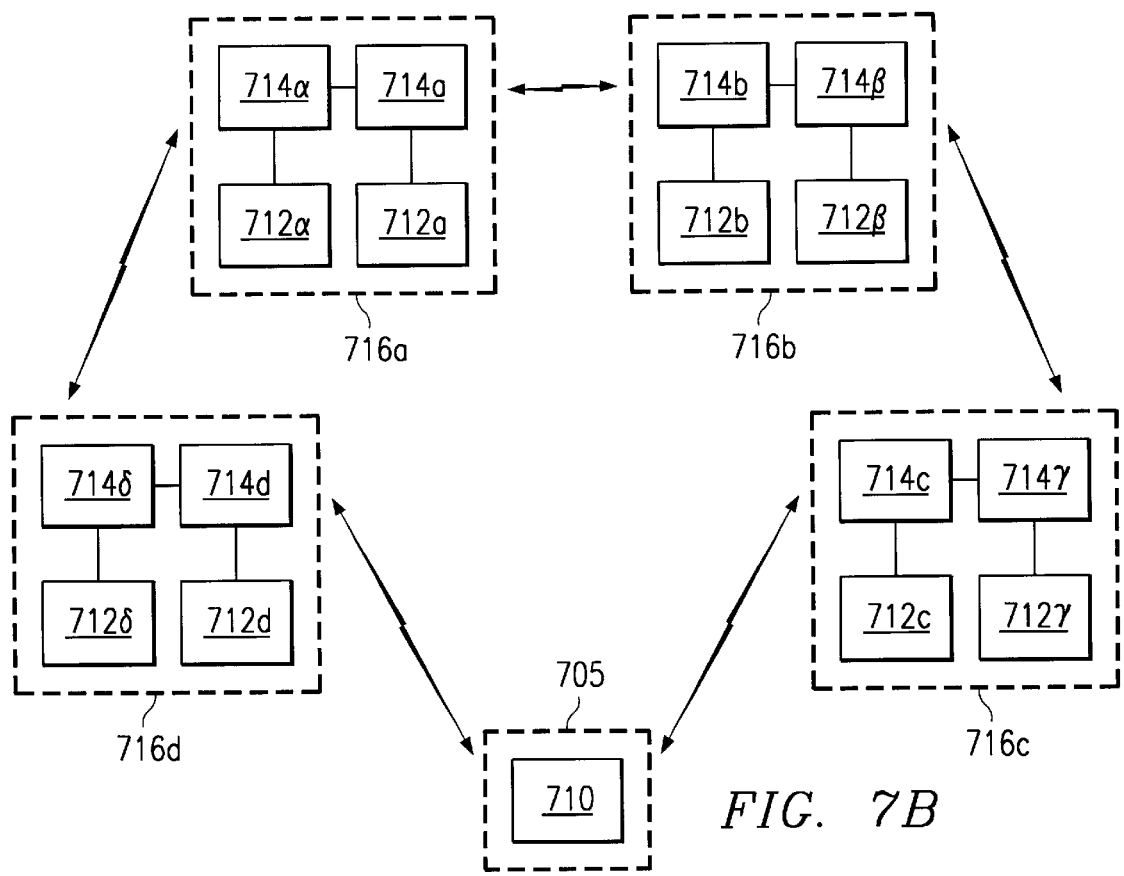

It should be appreciated from embodiment illustrated in FIG. 7B that central facility 710 may be in communication with the various nodes of the network through wireless links, i.e., links 711 of FIG. 7A are provided by the wireless links of the communication network. It should be further appreciated that links 711 of FIG. 7A may provide indirect signal paths between central facility 710 and ones of the parameter monitoring devices. For example link 711 between central facility and parameter monitoring device 712a in the topology of FIG. 7B may be provided through the wireless link between central facility 710 and node 716d in combination with the wireless link between node 716d and node 716a. Alternatively, this link 711 may be provided through the wireless link between central facility 710 and node 716b also in combination with the wireless link between node 716b and node 716a. Moreover, both such alternative links may be utilized by the central facility to provide reliable control and maintenance communications, such as where a particular wireless link fails rendering one embodiment of link 711 inoperable while an alternative embodiment of link 711 operable.

Although illustrated as a different configuration than the nodes of FIGS. 7A and 7B, the central facility of the present invention may in fact employ the same or similar equipment to that of a node of the network. For example, in one preferred embodiment of the present invention the central facility, or at least a portion thereof, is embodied in a software application program operable from any of a number of computer systems, including those of subscribers. Accordingly, radios and parameter monitoring devices such as shown at nodes 716a through 716d may be deployed at node 705 and a suitable computer coupled thereto for communication through the network. It should be appreciated that such an embodiment of central facility 710 allows for the provision of a control facility, or portions thereof, at any node or multiple nodes, of the network rather than one specific node as illustrated in FIGS. 7A and 7B. Of course, as parameter monitoring functions operable from the control facility of the present invention may be misused, either accidently or on purpose, to result in less than optimum performance, and even failure of the network, security elements, such as the use of user authorization verification (i.e., passwords, PINs, keys, either electronic or mechanical, or the like), may preferably be employed. Additionally, as the control facility of the present invention can be embodied in such application programs, a reduced set of its functionality may be included in one version of such application programs, such as for a subscriber information system administrator and a different or full set of its functionality included in another version of the application programs, such as for a radio network system administrator.

Figure 9:
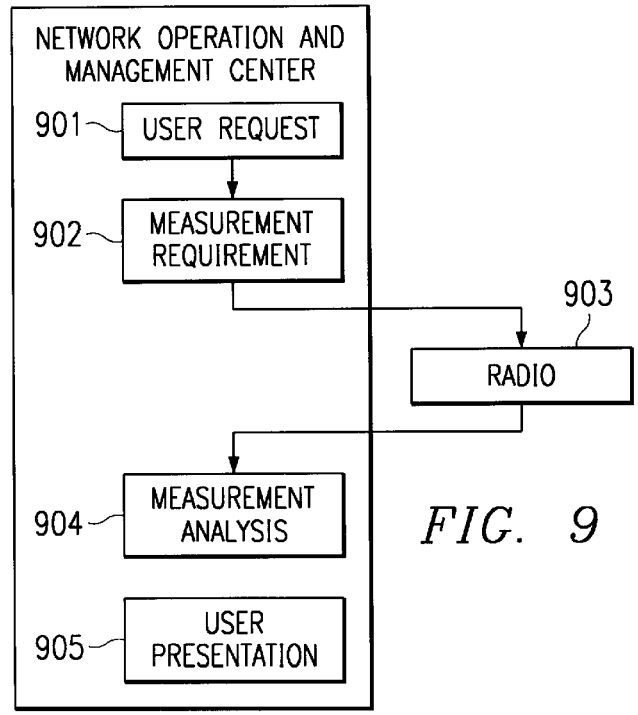
FIG. 9 shows a flow chart of a radio network measurement sequence.

Directing attention to FIG. 9, a typical control or operational sequence of the invention is shown. At step 901, a user may request that a control or other operation be performed according to the present invention. At step 902, the computer at the NOMC can respond to that request by asking the user to provide specific criteria for the operation desired. Alternatively, various predefined operations may be provided for selection, which require little or no further input by the user. For example, a graphical representation of the network may be presented to the user to allow selection of a particular link followed by selection of a particular control or monitoring operation to be carried out according to the present invention.

Once the parameters have been satisfactorily determined, commands may be sent to one or more designated radio parameter monitoring devices for execution at step 903. Once any relevant measurements or other data has been collected, it may be sent from the radio parameter monitoring devices to the NOMC to be analyzed at step 904. This step may interpret the raw data and distill it into meaningful data. Finally, at step 905 the meaningful data may be presented to the user in a specified format and/or may be utilized in further instructing parameter monitoring, or other network device.

Operation according to the present invention may utilize various information regarding operation of the network equipment in order to perform control functions or perform tests or other operations desired by a user. Specific examples of the collection and use of such information according to the present invention are given below in order to aid in understanding the present invention. However, it should be appreciated that the below examples are not exhaustive of that possible with present invention and, therefore, are not intended to limit the scope of the appended claims.

Performance Parameters

Various performance parameters may be tested, measured, or monitored at each radio in order to provide information to a user as to performance of individual components and/or the network (or portions thereof) as well as to provide intelligent control of the network and its components. In a preferred embodiment, these parameters include those shown in Table 1, although it should be appreciated that other or like parameters may be utilized according to the present invention. Each parameter may be sampled or collected at predetermined intervals which fall within a specified range. A sampling rate selectable from 0.1 second to 10 minutes, depending on the nature of the requested data, is preferred.

TABLE 1

| Performance Related Parameters Description |
|---|
| Transmit Power Level |
| Receive Power Level |
| Energy per bit over the noise spectral |
| Power Density (Eb/No) |
| Bit Error Rate |
| Error-free Seconds |
| Samples of Received Signal |
| Path Loss |
| Interference Level |

Although any given operation may be specified and/or initiated by a human user, in a preferred embodiment some or all of the operations may be run autonomously by the relevant radio parameter monitoring device without further direction or monitoring by the user and/or the NOMC. Since each radio parameter monitoring device may preferably be programmed and/or instructed by the NOMC, or other intelligent controller or device, a particular operation may be started or stopped at specified times, immediately upon command, or when a specified condition occurs.

As previously described, there is a tradeoff in the other selection regarding what is the point of interest, what data to collect for that point of interest, the frequency of collection and data processing, and how to minimize the amount of data collected. Many of these tradeoffs may be customized by the user.

When requesting a control or test operation, the user may be presented with a menu of choices such as the following choices regarding the measurement relevant to the desired operation:

a) Type of measurement requested:
Single radio link performance
Radio network performance
Propagation data
b) The format of the results:
Snap Shot
Statistical
Correlation
c) Specificity of results
Generic
Event specific Single Radio ink Performance Snap shot data with respect to single radio link performance may provide a one-time measurement of one or more performance related parameters, such as those listed in Table 1. The results presentation may be in the form of a graphic plot, table or/and filtering.

Single radio link performance statistical data may include distribution, cumulative distribution, mean, standard deviation, etc. of the parameters, such as those listed in Table 1, as measured over a period of time for a single link or radio. Accordingly, it may include statistical representations of power control performance, interference level, not-noise-like degradation, or rate of change in transmit power or the like.

Correlation data for single radio link performance may include joint distribution or joint cumulative distribution of the parameters, such as those listed in Table 1. Accordingly, it may include correlation of power control performance versus rate of change in transmit power or the like.

Any of these measurements may be taken on command, at predetermined time intervals, or upon the occurrence of a particular event.

Radio Network Performance

A snap shot for radio network performance may provide a one-time measurement of one or more performance related parameters, such as those listed in Table 1, over multiple radio links. The results presentation may be in the form of a graphic plot, table or/and filtering Radio network performance statistical data may include distribution, cumulative distribution, mean, standard deviation of the parameters, such as those listed in Table 1, as measured over a period of time for multiple links or radios. Accordingly, it may include statistical representation of power control performance, interference level, not-noise-like degradation, rate of change in transmit power or the like.

Radio network performance correlation data may include joint distribution or joint cumulative distribution of parameters, such as those listed in Table 1, for multiple radio links. Accordingly, it may include correlation of parameters of various links according to a radio mutual interference matrix, correlation of power control stability as between various links, etc., for multiple links.

Propagation Data

A propagation data snap shot may provide a one-time measurement of one or more propagation-related parameters, such as propagation loss or rate of change of propagation loss. The results presentation may be in the form of a graphic plot, table or/and filtering.

Statistical data with respect to propagation data may include distribution, cumulative distribution, mean, standard variation of propagation loss and rate of change in propagation loss.

Propagation data correlation data may include joint distribution or joint cumulative distribution of propagation loss and rate of change in propagation loss over multiple radio links. It may indicate the probability that 'n' consecutive radio links will exceed a predetermined propagation loss per unit transmission distance for given links.

As an example of a user selected test sequence (or test sequence invoked in response to a user selected operation), selection of radio network performance measurements may be made and thereafter a selection of the type of measurements required/desired, such as generic or event specific. Selection of generic may operate to take measurements immediately, at a next predetermined test interval, or simply retrieve measurements previously or currently measured by parameter monitoring devices. Selection of event specific may program particular parameter monitoring devices to make appropriate measurements upon a particular condition or to download stored measurements associated with a past occurrence if a particular event. The particular radio network performance measurement may be material interference as among links of the network. Accordingly, a radio mutual interference matrix may be utilized in a test that can show the relationship in terms of interference between link m and link n, n and m=2, 3, 4, 5, etc. Table 2 shows a 3 by 3 radio mutual interference matrix with the first row showing link 1 to 2 and 3 coupling, the second row showing link 2 to 1 and 3 coupling, etc. This matrix may initially indicate links likely to be coupled and links unlikely to be coupled, such as due to their physical orientation. Such a predetermined elimination of various ones of the links from those possibly being coupled, and therefore suggesting testing, monitoring, or measuring of only the remaining ones of the links, can expedite testing and measurement. However, due to a phenomenon such as multi-path and indirect propagation, it may be desirable to not exclude some or all links of the network in favor of empirical testing, monitoring, or measuring. Once the interference pairs have been selected in this matrix, the next process may be the data collection design, i.e., what and how measurements are to be taken.

TABLE 2

| 3 × 3 radio mutual interference matrix | | | | |
|---|---|---|---|---|
| Link Identification | Link # | 1 | 2 | 3 |
| Sand Lake 1 | 1 | NA | | |
| International Drive | 2 | | NA | |
| John Young | 3 | | | NA |

Figure 10:
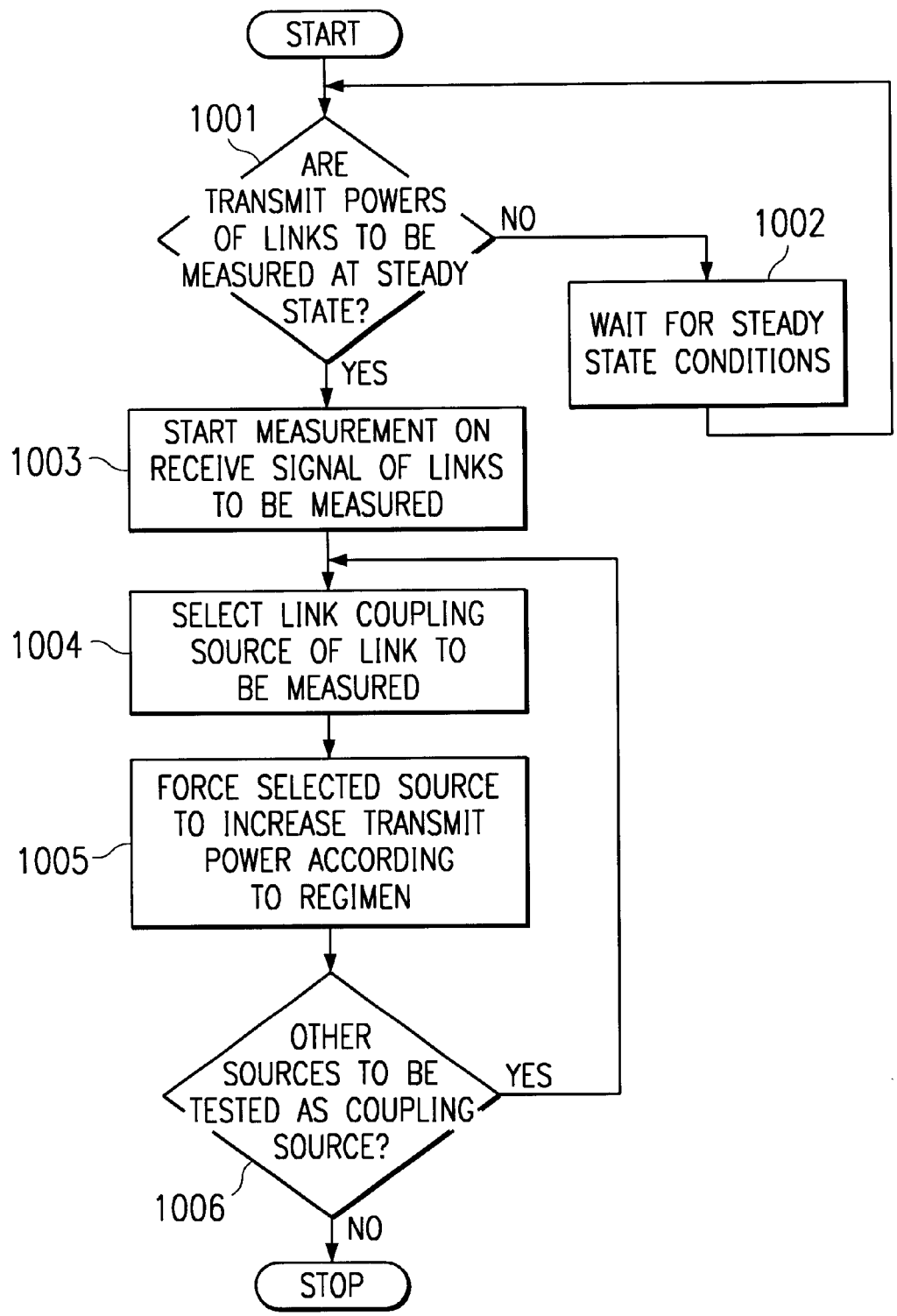
FIG. 10 shows a flow chart of design of a radio network performance test sequence.

Directing attention to FIG. 10, a flow chart of a radio network test sequence to determine mutual interference according to a preferred embodiment of the present invention is shown. Data collection may be designed for the radio network or any portion thereof according to the steps of this flow diagram. Specifically, as measurement is preferably to be performed when the system is at the steady state, step 1001 determines if the transmit power of each link to be tested, i.e., links 1, 2 and 3 of Table 2, are at the steady state. This determination may be made by taking 20 measurements of transmit power of link 1, 2, and 3 at 15 second intervals and comparing these measurements to a threshold steady state hysteresis value. For example, steady state may be determined to exist if the variation is less than +−0.5 db.

If steady state is found to exist the test sequence proceeds to step 1003. However, if steady state is not found to exist, then the test sequence proceeds to step 1002 where a pause is made for steady state conditions. For example, step 1002 may introduce a predetermined wait, such as a 15 minute wait, and thereafter repeat step 1001.

At step 1003 the measurement of receive signal level of the links to be measured, e.g. links 1, 2, and 3, are started so as to record the appropriate data as the remaining steps of the test sequence are performed.

At step 1004 a link coupling source of the links to be measured is selected, e.g., the transmitter of links 1, 2 or 3 is selected. Accordingly, these various link to link measurements may be made, such as link 1 to links 2 and 3 interference measurements where the transmitter of link 1 is selected as the coupling source in step 1004.

At step 1005, the selected coupling source is forced to increase transmit power according to a predetermined regime. For example, the link 1 transmit power may be forced to increase 0.5 dB every minute, starting 5 minutes from initiation of the test sequence and stopping 15 minutes from then. Accordingly, the coupling resulting from this selected source may be recorded at the parameter monitoring devices of each of the other links as commanded at step 1003.

At step 1006 a determination is made as to whether there are other coupling sources to be tested. If so, the test sequence proceeds through the relevant steps to perform tests as described above. For example, using the links of Table 2, step 1004 may be repeated to select another link coupling source to start link 2 to links 1 and 3 interference measurements.

Accordingly, at step 1005 the link 2 transmit power may be forced to increase 0.5 dB every minute, starting 20 minutes from initiation of the test sequence and stopping 30 minutes from then. Similarly, step 1004 may be repeated to select the remaining link coupling source of Table 2 to start link 3 to links 1 and 2 interference measurements. Thereafter, at step 1005, the link 3 transmit power may be forced to increase 0.5 dB every minute, starting 35 minutes from initiation of the test sequence and stopping 45 minutes from then. In such an embodiment, the test would continue for approximately 50 minutes from the time of initiation.

Once the test sequence has been assembled, the relevant commands may be transmitted to the relevant radio parameter monitoring devices at the radio sites.

Test and Command Initiation

Each radio parameter monitoring device may be directed to perform a test with a "Get" or similar message or to respond to a control command with a "Do" or similar message. A "Get" message may be a command message from the NOMC, or other controller to a radio parameter monitoring device, directing the parameter monitoring device to collect certain performance related parameters. The "Do" message may be a command message from the NOMC to a radio parameter monitoring device, directing the parameter monitoring device to change an operating parameter or condition of an associated radio component, such as a transmitter or modem. The message may also specify constraints such as sampling or adjustment intervals or a time or condition upon which to take effect. For ease of managing the performance data collection and otherwise simplify management and control of the radio network, the following preferred embodiment management schemes may be adopted to provide a hierarchy of data collection and control techniques suitable to address various situations of interest:

a) Autonomous: the performance data will be collected continuously or the command will be implemented under control of the parameter monitoring device operating program.

b) Autonomous with conditions: the performance data will be collected or the command will be implemented if the conditions are met. Typical conditions are time (start at time xx and stop at time yy) and/or thresholds (start when a performance parameter exceeds a threshold x and stop when it is below a threshold y). This command can be very complex based on conditions, e.g. each condition could trigger a new domain of data collection. For example, reaching a certain parameter value might cause the parameter monitoring device to start examining other parameters for testing decisions. The programmable capability of this feature can make it very useful for flexible test and operations design.

c) On demand: The performance data will be collected will be implemented right away irrespective of the parameter monitoring device operating program.

Once the requested or useful data has been collected by the radio parameter monitoring device, it may be placed into a specified format. One possible collected data format is shown in Table 3.

TABLE 3

| Receiver power | |
|---|---|
| Data | Comment |
| 13:20: 12, Oct. 7, 1998 | start time (hour: minute: second), data |
| 13:56:20, Oct. 7, 1998 | Stop time, data |
| 0.5 | Sampling time in seconds |
| Horizontal | Polarization |
| −60 | dBm |
| −60.2 | |
| −60.3 | |
| −60.4 | |
| etc. | |

Analysis and Presentation of Results

Once data has been collected by the radio parameter monitoring device, it may transmit these results back to the requesting entity, typically the NOMC, for analysis, presentation, and subsequence control operating based thereon. The results may be immediately transmitted back to the NOMC, may be transmitted back at a specified time, or may be held until each parameter monitoring device is commanded to return the data. Intermediate results might also be transmitted while a test is still in progress. The actual data sent may depend on what has been requested.

The format used to present the data to the user may depend on what was requested. Again using the "Radio mutual interference matrix" as an example, any change in the receive power in one link due to an increase in transmit power in other link can indicate interference. This interference might be computed relative to noise, and presented as shown in Table 4.

TABLE 4

3/3 radio mutual interference matrix in dB below noise

| Link Identification | Link # | 1 | 2 | 3 |
|---|---|---|---|---|
| Sand lake 1 | 1 | NA | −6 | nil |
| International Drive | 2 | −3 | NA | −7 |
| John Young | 3 | −1 | nil | NA |

As shown, both the operations to be performed and the format of the results can be specified by the user. Complex operations, such as combination tests, may be performed to determine the interference effects of one link on another, and other interrelated or distributed network effects can be tested with this invention.

The data collected in this manner may be utilized to present information to the user, to intelligently control the network or portions thereof (whether autonomously or under the direction of a user), and combination thereof. In order to present information in a useful and user friendly manner, the preferred embodiment of the present invention provides both analysis of user input/requests and any data collected in response thereto.

For example, a user may only know that he/she wishes to receive information on link conditions at a particular link, and in response to input indicating same, the central facility of the present invention, preferably through prompting and querying as described in the above example, may analyze user input to determine what link to monitor, the type of monitoring/data collection to perform, the actual link parameters or other attributes to monitor, and the like. Thereafter the central facility of the preferred embodiment may utilize this information to design a data collection sequence suitable for acquiring the desired data. As described above in the example given, the actual measurements taken may be significantly more complicated than appreciated by the user simply requesting a particular link attribute. For example, various component parameters may require monitoring in order to provide a piece of refined information requested by the user.

Commands consistent with the determined data collection sequence are then preferably transmitted from the central facility to the proper parameter monitoring devices for data collection as described above. This data may then be returned to the preferred embodiment central facility, either in response to a subsequent request by the central facility or autonomously by the parameter monitoring device. Thereafter, the central facility may analyze the particular data collected by the parameter monitoring devices and, in particular circumstances, manipulate refine, correlate, or otherwise prepare the raw data for use according to the user's request. Such use may be the display of the information in a readily understandable form to the user, i.e., the user may have requested information regarding a particular link's current status, requiring the central facility to determine the measurable link status parameters, direct the equipment of at least two end points of the link to collect and/or disgorge this information, and compile a useful presentation, such as a percentage reliability, from analyzing the information.

Additionally, or a alternatively, such use may be to determine that network, link, or component operation is not optimized through analysis of this information and issuing instructions to the proper parameter monitoring devices, directing their control of associated components, to optimize the proper portion of the network, i.e., if the link reliability is below a desired threshold, the central facility may determine that the increments at which a link transmitter increases power must be too small by referencing historical bit error information, power level adjustment information, or the like, resulting from the data query, and accordingly, instruct the parameter monitoring device associated with the transmitter to use larger increments in power adjustments, such as to compensate for unusually instantaneous heavy rainfall onset present in this particular link.

Moreover, as discussed above, with respect to the use of a radio mutual interference matrix of a preferred embodiment, the control of a particular radio device may in response to measurements of link conditions not directly associated with that radio device. For example, the less than desirable link reliability determined in the above example may be, at least partially, the result of unnecessarily increased transmit levels at a nearby link. Reference to the matrix in the above described central facility analysis of data may indicate control of a radio device at a particular link may be desired.

Accordingly, it should be appreciated that the present invention provides not only a system and method by which a user may centrally monitor and control a radio network, or portions thereof, but also provides an improved user interface in that analysis and/or refining of the network operation data is also provided. Accordingly, a user need not know or understand all levels or operation of the network or its components to effectively monitor, control, and optimize the network and its components.

The foregoing description is intended to be illustrative and not limiting. Obvious variations may occur to those of skill in the art. Such variations are encompassed by the invention, which is limited only by the scope and spirit of the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system providing management functions in a radio network, said system comprising:

a user interface adapted to accept input from a user with respect to management functions desired and to present results of a particular said desired management function;

a user input interpretation and analysis module adapted to accept said accepted user input and to determine a set of management instructions suitable for accomplishing a particular said desired management function;

a management device interface adapted to present said set of management instructions to appropriate management devices of said radio network substantially simultaneously and to accept results of particular instructions of said set of management instructions presented to said management devices; and a plurality of management devices each coupled to an associated radio device of said radio network, wherein said management devices include a processor-based system operable to respond to instructions directed to said management device and to perform a task in response thereto selected from the group of tasks comprising monitor an attribute of said radio device and control an attribute of said radio device.

2. The system of claim 1, wherein said user interface, said user input interpretation and analysis module, and said management device interface are each at least in part included in a management application program operable upon a processor-based system.

3. The system of claim 2, wherein said processor-based system is a general purpose processor-based system operable to perform general purpose applications substantially contemporaneous with operation of said management application program.

4. The system of claim 2, wherein said management application program is operable on a plurality of said processor-based systems coupled to said radio network.

5. The system of claim 1, wherein said user input interpretation and analysis module analyzes user input to determine radio device monitoring and control available from said plurality of management devices suitable for accomplishing said desired management function and particular management devices useful in accomplishing said desired management function.

6. The system of claim 5, wherein said user input interpretation and analysis module parses said set of management instructions for providing to said particular management devices.

7. The system of claim 1, wherein said user input interpretation and analysis module comprises:
a controller module adapted to accept information selected from the group consisting of portions of said accepted user input and portions of said accepted results and to determine a set of management instructions suitable for controlling the operation of particular ones of said radio devices.

8. The system of claim 7, wherein operation of said controller module includes reference to a radio mutual interference matrix.

9. The system of claim 8, wherein said matrix provides information indicating coupling of different links of said radio network.

10. The system of claim 8, wherein said matrix provides information indicating interference between different links of said radio network.

11. The system of claim 7, wherein said management instructions suitable for controlling the operation of particular ones of said radio devices are expressly adapted to optimize at least a portion of said radio network.

12. The system of claim 11 wherein a network parameter optimized by said management instructions suitable for controlling the operation of particular ones of said radio devices is selected from the group consisting of:
a particular node information capacity;
a particular node bit error rate;
a particular link bit error rate;
a particular link reliability attribute;
a particular link information capacity;
a network reliability attribute;
a network information capacity; and
an inter-link interference attribute.

13. The system of claim 1, wherein said management device interface utilizes links of said radio network for communication between said management device interface and management devices of said plurality of management devices.

14. The system of claim 13, wherein use of said links of said radio network comprises the use of a user payload data manipulator to interleave data of said set of management instructions with said user payload data.

15. The system of claim 1, wherein ones of said management devices comprise a memory for storing monitored attribute information.

16. The system of claim 15, wherein said monitored attribute information stored in said memory is stored in response to instructions of said set of management instructions.

17. The system of claim 15, wherein said monitored attribute information stored in said memory is stored in response to an associated said management device autonomously determining said attribute should be monitored.

18. The system of claim 17, wherein said autonomous determination is made at least in part in response to a predetermined threshold value being traversed.

19. The system of claim 17, wherein said management device is programmable while in service and said autonomous determination is made under control of programming instructions provided to said management device while in service.

20. The system of claim 19, wherein said programming instructions are provided to said management device through said management device interface.

21. The system of claim 19, wherein said programming instructions are provided to said management device from a centralized control facility.

22. A method for providing management functions in a radio network, said method comprising the steps of:
at a control node of said radio network;
interfacing with a user to accept input from a user with respect to management functions desired and to present results of a particular said desired management function;
accepting user input regarding a particular desired management function desired;
analyzing said accepted user input to determine a set of management instructions suitable for accomplishing a particular said desired management function;
generating said set of management instructions suitable for accomplishing said particular management function;
outputting said set of management instructions to appropriate management devices of said radio network substantially simultaneously and to accept results of particular instructions of said set of management instructions presented to said management devices; and
receiving raw information from said appropriate management devices regarding execution of instructions of said set of management instructions;
manipulating said raw information for further use by said control node, wherein said further use is selectable from a group consisting of further control of said management devices of said radio network as a function of said manipulated data and presentation to said user in a form adapted for improved assimilation; and
presenting said manipulated information to said user if consistent with said desired management function and generating and outputting a further set of management instructions as a function of said manipulated information if consistent with said desired management function; and at said appropriate management devices of said radio network:

receiving instructions of said set of management instructions directed to particular ones of said management devices;

communicating with a radio network device associated with said particular management device in accordance with said received instructions; and outputting at least a portion of said raw information as a function of said communication with said radio network device.

23. The method of claim 22, wherein said control node is also a subscriber node of said radio network.

24. The method of claim 22, wherein said control node comprises an application program operable upon a general purpose processor-based system.

25. The method of claim 24, wherein said application program is operable on a plurality of said processor-based systems coupled to said radio network.

26. The method of claim 22, wherein said analyzing step comprises the steps of:

determining particular management devices useful in accomplishing said desired management function, said determined particular management devices being said appropriate management devices; and determining radio device monitoring and control functions available from said appropriate management devices suitable for accomplishing said particular desired management function.

27. The method of claim 26, wherein said analyzing step further comprises the step of:

parsing said set of management instructions for providing ones of said instructions to particular ones of said appropriate management devices.

28. The method of claim 22, wherein said presenting said manipulated information step comprises the step of:

determining a set of management instructions suitable for controlling the operation of particular ones of said radio devices.

29. The method of claim 28, wherein said presenting said manipulated information step further comprises the step of:

referring to a radio mutual interference matrix.

30. The method of claim 28, wherein said presenting said manipulated information step further comprises the step of:

adapting said management instructions suitable for controlling the operation of particular ones of said radio devices to optimize at least a portion of said radio network.

31. The method of claim 22, wherein said outputting said set of management instructions to appropriate management devices comprises the step of:

transmitting said set of management instructions via wireless links of said radio network.

32. The method of claim 31, wherein said step of transmitting comprises the step of:

multiplexing said set of management instructions with user data communicated via said radio network wireless links.

33. The method of claim 22, wherein said step of communicating with a radio network device comprises the step of:

storing monitored attribute information in a memory of said management device.

34. The method of claim 33, wherein said monitored attribute information stored in said memory is stored in response to instructions of said set of management instructions.

35. The method of claim 33, wherein said monitored attribute information stored in said memory is stored in response to an associated said management device autonomously determining said attribute should be monitored.

36. The method of claim 35, wherein said autonomous determination is made at least in part in response to a predetermined threshold value being traversed.

* * * * *